United States Patent
August et al.

(10) Patent No.: US 11,818,205 B2
(45) Date of Patent: Nov. 14, 2023

(54) SYSTEM FOR IDENTITY-BASED EXPOSURE DETECTION IN PEER-TO-PEER PLATFORMS

(71) Applicant: BANK OF AMERICA CORPORATION, Charlotte, NC (US)

(72) Inventors: Daniel Jerry August, Denver, NC (US); Neal Aaron Slensker, Fort Mill, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 392 days.

(21) Appl. No.: 17/199,784

(22) Filed: Mar. 12, 2021

(65) Prior Publication Data
US 2022/0294846 A1    Sep. 15, 2022

(51) Int. Cl.
| | |
|---|---|
| G06F 15/16 | (2006.01) |
| G06F 9/54 | (2006.01) |
| H04L 29/06 | (2006.01) |
| H04L 67/1042 | (2022.01) |
| H04L 67/1074 | (2022.01) |
| G06F 16/22 | (2019.01) |
| G06F 9/50 | (2006.01) |

(52) U.S. Cl.
CPC ........ H04L 67/1042 (2013.01); G06F 9/5005 (2013.01); G06F 16/22 (2019.01); H04L 67/1078 (2013.01)

(58) Field of Classification Search
CPC . H04L 67/1042; H04L 67/1078; G06F 16/22; G06F 9/5005; G06F 9/50

USPC .......................................................... 709/221
See application file for complete search history.

(56) References Cited

U.S. PATENT DOCUMENTS

| | | |
|---|---|---|
| 7,004,382 B2 | 2/2006 | Sandru |
| 7,136,827 B2 | 11/2006 | Eicher |
| 7,630,914 B2 | 12/2009 | Veeningen et al. |
| 7,653,563 B2 | 1/2010 | Veeningen et al. |
| 7,711,584 B2 | 5/2010 | Helitzer et al. |
| 7,809,650 B2 | 10/2010 | Bruesewitz et al. |
| 7,818,806 B1 | 10/2010 | Gyugyi et al. |
| 7,934,255 B1 | 4/2011 | Gyugyi |
| 8,116,734 B2 | 2/2012 | Vawter |
| 8,412,556 B2 | 4/2013 | Wotzel et al. |
| 8,630,888 B2 | 1/2014 | Seefeld et al. |

(Continued)

*Primary Examiner* — Hamza N Algibhah
(74) *Attorney, Agent, or Firm* — Moore & Van Allen PLLC; Anup Shrinivasan Iyer (57) ABSTRACT

Systems, computer program products, and methods are described herein for identity-based exposure detection in peer-to-peer (P2P) platforms. The present invention is configured to receive, from a computing device of a P2P platform, an indication that a user has initiated a P2P resource transfer request to a first entity; retrieve, from a computing device of the P2P platform, resource transfer information of the first entity based on at least the P2P resource transfer request; initiate a database query on a P2P knowledge repository using the resource transfer information of the first entity; determine a match between the resource transfer information of the first entity and at least one entity record in the P2P knowledge repository based on at least initiating the database query; and transmit a notification to the computing device of the P2P platform indicating that the first entity is known to be associated with misappropriate activity.

17 Claims, 6 Drawing Sheets

(56) References Cited

U.S. PATENT DOCUMENTS

| | | |
|---|---|---|
| 8,693,043 B2 | 4/2014 | Schmidtler et al. |
| 8,774,516 B2 | 7/2014 | Amtrup et al. |
| 8,972,297 B2 | 3/2015 | Kay et al. |
| 8,977,615 B2 | 3/2015 | Ohnemus et al. |
| 8,990,930 B2 | 3/2015 | Burrell et al. |
| 9,037,648 B2 | 5/2015 | Ogilvie et al. |
| 9,137,417 B2 | 9/2015 | Macciola et al. |
| 9,311,676 B2 | 4/2016 | Helitzer et al. |
| 9,349,046 B2 | 5/2016 | Macciola et al. |
| 9,626,701 B2 | 4/2017 | Capps et al. |
| 9,665,910 B2 | 5/2017 | Chalfant et al. |
| 9,767,354 B2 | 9/2017 | Thompson et al. |
| 9,769,354 B2 | 9/2017 | Thrasher et al. |
| 10,269,009 B1 | 4/2019 | Winklevoss et al. |
| 10,275,756 B2 | 4/2019 | Uzo |
| 10,402,824 B2 | 9/2019 | Michelsen et al. |
| 10,789,098 B1 * | 9/2020 | Lin ..................... H04L 47/781 |
| 10,861,012 B2 | 12/2020 | Mehew et al. |
| 11,200,558 B2 * | 12/2021 | Qin ..................... H04W 72/542 |
| 11,201,867 B1 * | 12/2021 | Jiang ..................... H04W 12/06 |
| 11,663,577 B2 * | 5/2023 | Wang ..................... G06Q 20/326 |
| | | 705/39 |
| 2003/0233575 A1 | 12/2003 | Syrjanen et al. |
| 2006/0010032 A1 | 1/2006 | Eicher et al. |
| 2006/0111927 A1 | 5/2006 | Sereville |
| 2008/0189158 A1 | 8/2008 | Bala et al. |
| 2014/0214670 A1 * | 7/2014 | McKenna .......... G06Q 20/4014 |
| | | 705/44 |
| 2018/0232258 A1 * | 8/2018 | Kendall ................ G06F 9/50 |
| 2018/0308073 A1 * | 10/2018 | Kurian ................ G06F 9/5011 |
| 2018/0335928 A1 * | 11/2018 | Van Os ............... G06F 3/04817 |
| 2018/0336543 A1 * | 11/2018 | Van Os ................ G06F 3/167 |
| 2019/0114643 A1 * | 4/2019 | Dewitt ............... G06Q 20/3226 |
| 2019/0251561 A1 * | 8/2019 | Oosthuizen ............... G07F 7/10 |
| 2020/0143353 A1 * | 5/2020 | Van Os ............. G06Q 20/3272 |
| 2021/0049596 A1 * | 2/2021 | Guo ..................... H04L 9/3247 |
| 2021/0141517 A1 * | 5/2021 | Camargo ............. H04L 67/535 |
| 2021/0166178 A1 * | 6/2021 | Kehner ................ G06F 16/29 |
| 2023/0153719 A1 * | 5/2023 | Jain ..................... G06Q 20/386 |
| | | 705/7.25 |

\* cited by examiner

SYSTEM FOR IDENTITY-BASED EXPOSURE DETECTION IN PEER-TO-PEER PLATFORMS

FIELD OF THE INVENTION

The present invention embraces a system for identity-based exposure detection in peer-to-peer (P2P) platforms.

BACKGROUND

In recent years, peer-to-peer (P2P) resource transfers have developed to describe a new way of exchanging resources without relying on traditional intermediaries. One of the most appealing benefits of P2P resource transfers is the ease of use and convenience. As more users and/or entities adopt P2P resource transfer systems, there is a need for a system for an identity-based exposure detection to preempt the possibility of misappropriating activity.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for identity-based exposure detection in peer-to-peer (P2P) platforms is presented. The system comprising: at least one non-transitory storage device; and at least one processing device coupled to the at least one non-transitory storage device, wherein the at least one processing device is configured to: receive, from a computing device of a P2P platform, an indication that a user has initiated a P2P resource transfer request to a first entity; retrieve, from a computing device of the P2P platform, resource transfer information of the first entity based on at least the P2P resource transfer request; initiate a database query on a P2P knowledge repository using the resource transfer information of the first entity; determine a match between the resource transfer information of the first entity and at least one entity record in the P2P knowledge repository based on at least initiating the database query; and transmit a notification to the computing device of the P2P platform indicating that the first entity is known to be associated with misappropriate activity based on at least determining the match.

In some embodiments, the at least one processing device is further configured to: determine that the resource transfer information of the first entity does not match at least one entity record in the P2P knowledge repository; transmit a first information retrieval request to the computing device of the P2P platform, wherein the first information retrieval request comprises the resource transfer information of the first entity; and receive, from the computing device of the P2P platform, a device identification information, a personal identification information, and a resource distribution account information of the first entity in response to the first information retrieval request.

In some embodiments, the at least one processing device is further configured to: initiate the database query on a resource knowledge repository using resource distribution account information of the first entity; retrieve, from the resource knowledge repository, a corresponding personal identification information associated with the resource distribution account information of the first entity; compare the personal identification information received from the computing device of the P2P platform with the personal identification information retrieved from the resource knowledge repository; determine a mismatch between the personal identification information received from the computing device of the P2P platform with the personal identification information retrieved from the resource knowledge repository; and transmit notification to the computing device of the P2P platform indicating that the first entity could be associated with misappropriate activity based on at least the mismatch.

In some embodiments, the at least one processing device is further configured to: receive, from a computing device of a user, an exposure notification associated with a second entity, wherein the exposure notification is associated with a second resource transfer; and retrieve, from the exposure notification, a second resource transfer information of the second entity.

In some embodiments, the at least one processing device is further configured to: transmit a second information retrieval request to the computing device of the P2P platform, wherein the second information retrieval request comprises the second resource transfer information of the second entity; and receive, from the computing device of the P2P platform, a device identification information, a personal identification information, and a resource distribution account information of the second entity in response to the second information retrieval request.

In some embodiments, the at least one processing device is further configured to: generate an entity record associated with the second entity, wherein the entity record comprises at least the second resource transfer information, the device identification information, the personal identification information, and the resource distribution account information of the second entity; and store the entity record associated with the second entity in the P2P knowledge repository.

In some embodiments, the resource transfer information of the first entity comprises at least a P2P account information.

In another aspect, a computer program product for identity-based exposure detection in peer-to-peer (P2P) platforms is presented. The computer program product comprising a non-transitory computer-readable medium comprising code causing a first apparatus to: receive, from a computing device of a P2P platform, an indication that a user has initiated a P2P resource transfer request to a first entity; retrieve, from a computing device of the P2P platform, resource transfer information of the first entity based on at least the P2P resource transfer request; initiate a database query on a P2P knowledge repository using the resource transfer information of the first entity; determine a match between the resource transfer information of the first entity and at least one entity record in the P2P knowledge repository based on at least initiating the database query; and transmit a notification to the computing device of the P2P platform indicating that the first entity is known to be associated with misappropriate activity based on at least determining the match.

In yet another aspect, a method for identity-based exposure detection in peer-to-peer (P2P) platforms is presented. The method comprising: receiving, using one or more processing devices, from a computing device of a P2P platform, an indication that a user has initiated a P2P resource transfer request to a first entity; retrieving, using the one or more processing devices, from a computing device of the P2P platform, resource transfer information of the first entity based on at least the P2P resource transfer request; initiating, using the one or more processing devices, a database query on a P2P knowledge repository using the resource transfer information of the first entity; determining, using the one or more processing devices, a match between the resource transfer information of the first entity and at least one entity record in the P2P knowledge repository based on at least initiating the database query; and transmitting, using the one or more processing devices, a notification to the computing device of the P2P platform indicating that the first entity is known to be associated with misappropriate activity based on at least determining the match.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "institution" may be any organization employing information technology resources and particularly technology infrastructure configured for processing large amounts of data. Typically, these data can be related to the people who work for the organization, its products or services, the customers or any other aspect of the operations of the organization. As such, the institution may be any group, association, financial institution, establishment, company, union, authority, or the like, employing information technology resources for processing large amounts of data.

As described herein, a "user" may be an individual associated with an institution and/or a P2P platform. As such, in some embodiments, the user may be an individual having past relationships, current relationships or potential future relationships with the institution and/or the P2P platform. In some embodiments, a "user" may be an employee (e.g., an associate, a project manager, an IT specialist, a manager, an administrator, an internal operations analyst, or the like) of the institution and/or the P2P platform or enterprises affiliated with the institution and/or the P2P platform, capable of operating the systems described herein. In some embodiments, a "user" may be any individual, entity, or system who has a relationship with the institution and/or the P2P platform, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system (e.g., institution system 130 and/or the P2P system 150) may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an institution. In such embodiments, the institution may employ additional computer systems, such as authentication servers, to validate and certify resources inputted by the plurality of users within the system. The system may further use its authentication servers to certify the identity of users of the system, such that other users may verify the identity of the certified users. In some embodiments, the institution may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities, or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, a "resource" may generally refer to objects, products, devices, goods, commodities, services, and the like, and/or the ability and opportunity to access and use the same. Some example implementations herein contemplate property held by a user and/or an institution, including property that is stored and/or maintained by a third-party institution. In some example implementations, a resource may be associated with one or more accounts. Examples of resources associated with accounts may be accounts that have cash or cash equivalents, commodities, and/or accounts that are funded with or contain property, such as safety deposit boxes containing jewelry, art or other valuables, a trust account that is funded with property, or the like.

As used herein, "resource distribution account" may refer to a storage location identifiable by resource distribution account information where one or more resources are organized, stored, and retrieved electronically using a computing device. To execute a resource transfer between one or more entities, between one or more users, or between one or more users and one or more entities, each party may be associated with a resource distribution account. When a resource transfer is executed by a first party (e.g., a user), the resources of the first party may be retrieved from their dedicated resource distribution account and transferred to the resource distribution account of a second party (e.g., entity). Typically, a resource distribution account is maintained by the institution or other financial institutions.

As used herein, a "resource transfer" may refer to any transaction, activities, or communication between one or more entities, between one or more users, or between one or more users and one or more entities. A resource transfer may refer to any distribution of resources such as, but not limited to, a payment, processing of funds, purchase of goods or services, a return of goods or services, a payment transaction, a credit transaction, or other interactions involving a user's resource or a resource distribution account.

In recent years, peer-to-peer (P2P) resource transfers have developed to describe a new way of exchanging resources without relying on traditional intermediaries. One of the most appealing benefits of P2P resource transfers is the ease of use and convenience. As more users and/or entities adopt P2P resource transfer systems, there is a need for a system for an identity-based exposure detection and preempt the possibility of misappropriating activity.

Figure 1A:
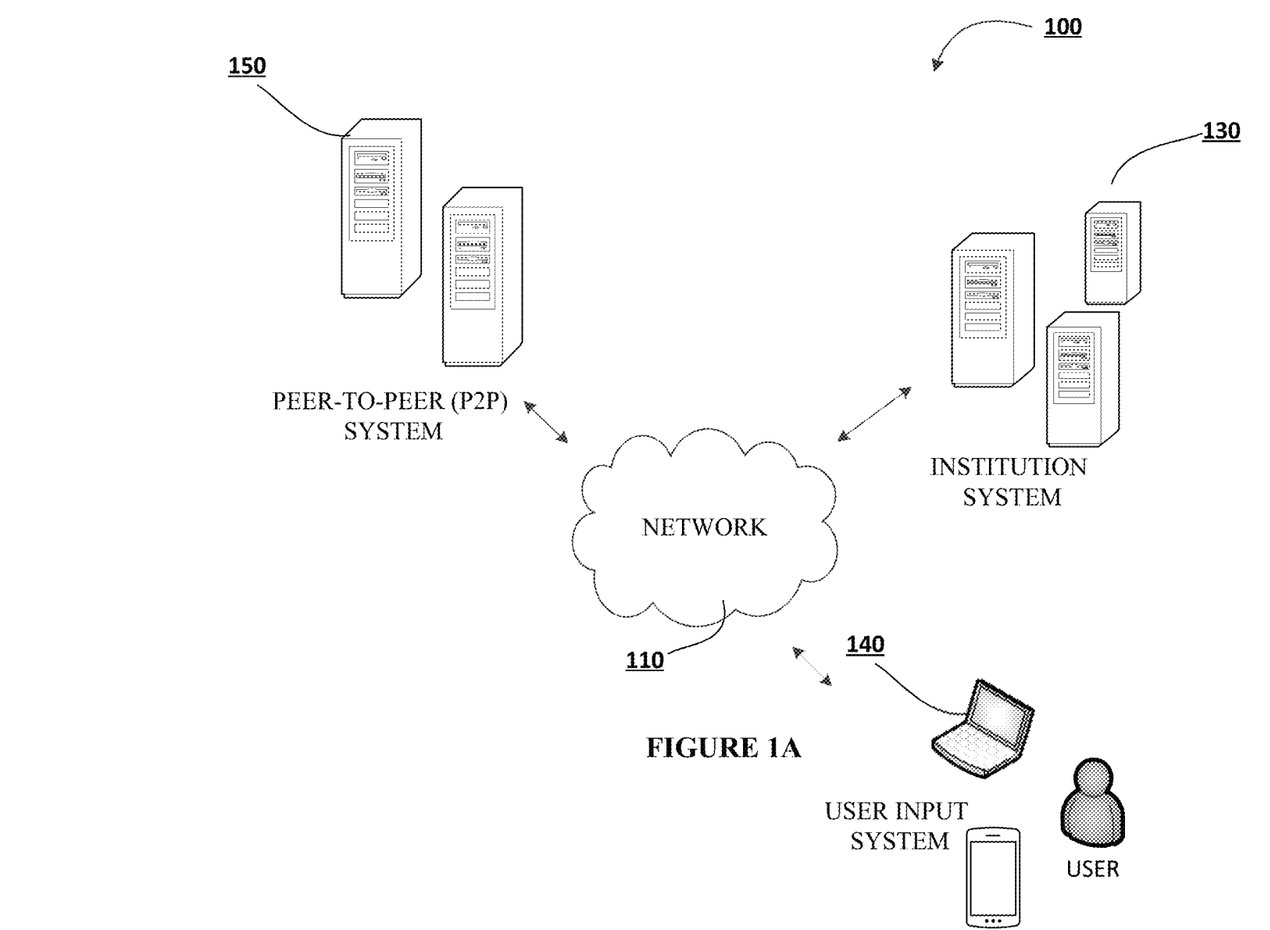
FIGS. 1A-1D illustrates technical components of a system for identity-based exposure detection in peer-to-peer (P2P) platforms, in accordance with an embodiment of the invention.

FIGS. 1A-1D presents an exemplary block diagram of the system environment for identity-based exposure detection in peer-to-peer (P2P) platforms 100, in accordance with an embodiment of the invention. FIG. 1A provides a unique network environment that includes specialized servers and systems communicably linked across a distributive network of nodes required to perform the functions of the process flows described herein in accordance with embodiments of the present invention.

As illustrated, the system environment 100 includes a network 110, an institution system 130, a peer-to-peer (P2P) system 150, and a user input system 140. In some embodiments, the institution system 130, the P2P system 150, and the user input system 140 may be used to implement the processes described herein, in accordance with an embodiment of the present invention. In this regard, the institution system 130, the P2P system 150, and/or the user input system 140 may include one or more applications (e.g., P2P mobile application) stored thereon that are configured to interact with one another to implement any one or more portions of the various user interfaces and/or process flow described herein.

In accordance with embodiments of the invention, the institution system 130 is intended to represent various forms of digital computers, such as laptops, desktops, video recorders, audio/video player, radio, workstations, personal digital assistants, servers, wearable devices, Internet-of-things devices, electronic kiosk devices, blade servers, mainframes, or any combination of the aforementioned. In accordance with embodiments of the invention, the P2P system 150 is intended to represent various forms of digital computers, such as laptops, desktops, video recorders, audio/video player, radio, workstations, personal digital assistants, servers, wearable devices, Internet-of-things devices, electronic kiosk devices, blade servers, mainframes, or any combination of the aforementioned. In accordance with embodiments of the invention, the user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Figure 1B:
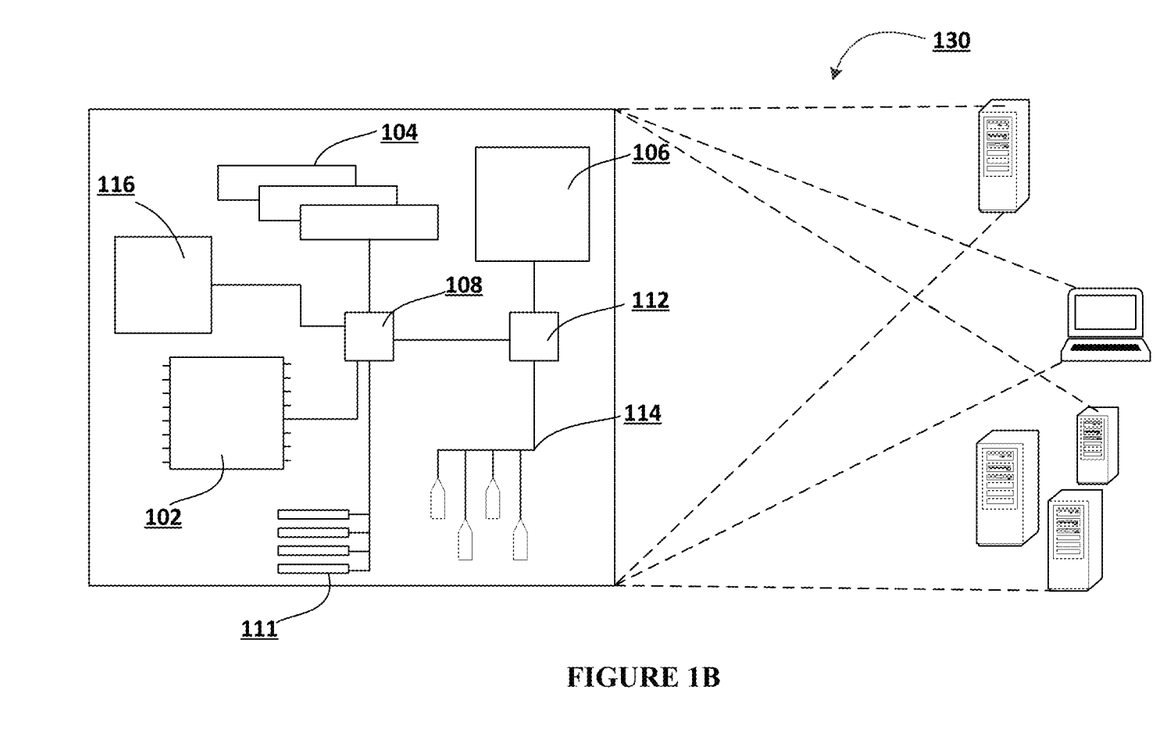

As illustrated in FIG. 1B, in accordance with some embodiments, the institution system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the institution system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to institution system 130 may be connected, with each system providing portions of the necessary operations (e.g., as a server bank, a group of blade servers, or a multi-processor system). In some embodiments, the institution system 130 may be a server managed by the business. The institution system 130 may be located at the facility associated with the business or remotely from the facility associated with the business.

The memory 104 stores information within the institution system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the institution system 130 may dynamically utilize the volatile memory over the non-volatile memory by storing multiple pieces of information in the volatile memory, thereby reducing the load on the system and increasing the processing speed.

The storage device 106 is capable of providing mass storage for the institution system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the institution system 130 may be configured to access, via the network 110, a number of other computing devices (not shown) in addition to the user input system 140 and the P2P system 150. In this regard, the institution system 130 may be configured to access one or more storage devices and/or one or more memory devices associated with each of the other computing devices. In this way, the institution system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the institution system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the institution system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The institution system 130 may be implemented in a number of different forms, as shown in FIG. 1B. For example, it may be implemented as a standard server, or multiple times in a group of such servers. Additionally, the institution system 130 may also be implemented as part of a rack server system or a personal computer such as a laptop computer. Alternatively, components from institution system 130 may be combined with one or more other same or similar systems and an entire institution system 130 may be made up of multiple computing devices communicating with each other.

Figure 1C:
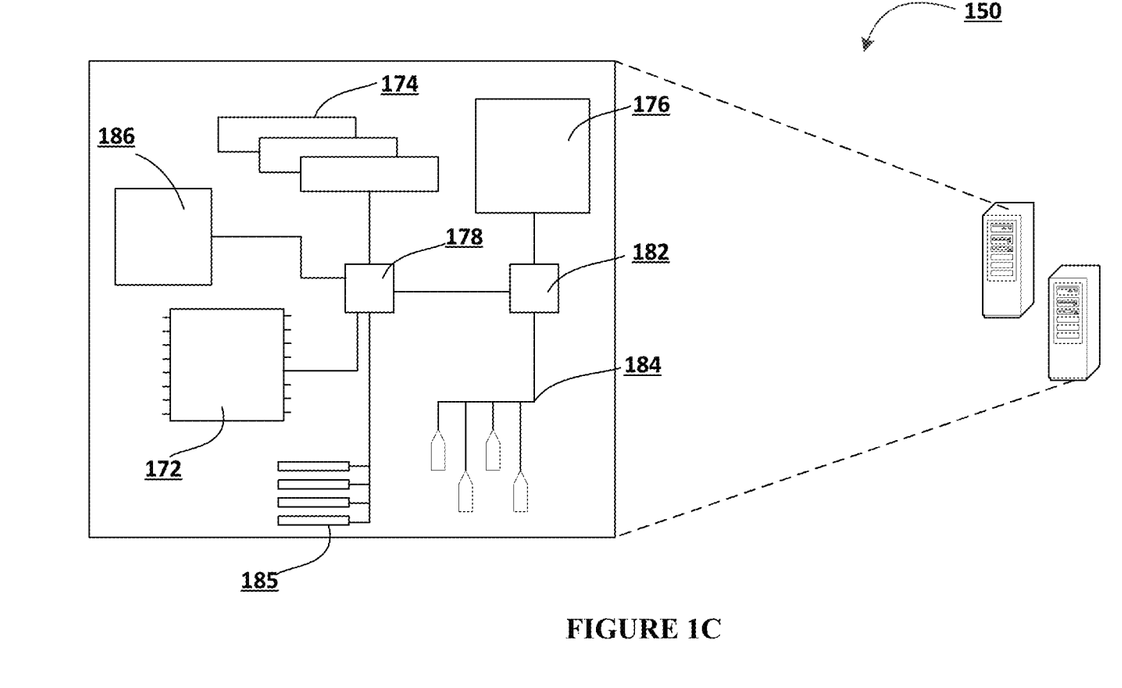

FIG. 1C illustrates a P2P system 150, in accordance with an embodiment of the invention. Similar to the institution system 130, the P2P system 150 may include a processor 172, memory 174, a storage device 176, a high-speed interface 178 connecting to memory 174 and high-speed expansion ports 185, and a low-speed interface 182 connecting to low speed bus 184 and storage device 176. Each of the components 172, 174, 176, 178 are interconnected using various buses and may be mounted on a common motherboard or in other manners as appropriate. Similar to the institution system 130, the processor 172 in the P2P system 150 can process instructions for execution within the P2P system 150, including instructions stored in the memory 174 or on the storage device 176 to display graphical information for a GUI on an external input/output device, such as display 186 coupled to a high-speed interface. In other implementations, multiple processors and/or multiple buses may be used, as appropriate, along with multiple memories and types of memory. Also, multiple systems, same or similar to P2P system 150 may be connected, with each system providing portions of the necessary operations (e.g., as a server bank, a group of blade servers, or a multi-processor system).

P2P may refer to a decentralized platform whereby one or more users and/or one or more entities may interact directly with each other, without mediation by a third party. To facilitate the interaction, the P2P system 150 (also referred to as P2P platform) may provide a P2P mobile application to be stored on the computing device of the user (e.g., user input system 140) who wishes to initiate a transfer of resources and on a computing device an entity (receiving party) who wishes to receive the initiated transfer. The P2P mobile application stored on the computing device of the user is linked to a resource distribution account of the user, such that when the user initiates a resource transfer using the P2P mobile application, the resources that are stored in the resource distribution account of the user are retrieved by the P2P mobile application and transferred to the entity. Similarly, the P2P mobile application stored on the computing device of the entity is linked to a resource distribution account of the entity, such that the resource transferred by the user are received by the P2P mobile application of the entity are then transferred to the resource distribution account of the entity. In some embodiments, the resource distribution account of the user and the resource distribution account of the entity may be managed by the same institution. In some other embodiments, the resource distribution account of the user and the resource distribution account of the entity may be managed by different institutions. In some embodiments, the P2P system 150 may be configured to establish P2P resource distribution accounts for the one or more users and/or the one or more entities that are configured to temporarily store resources that are retrieved from their respective resource distribution accounts.

Figure 1D:
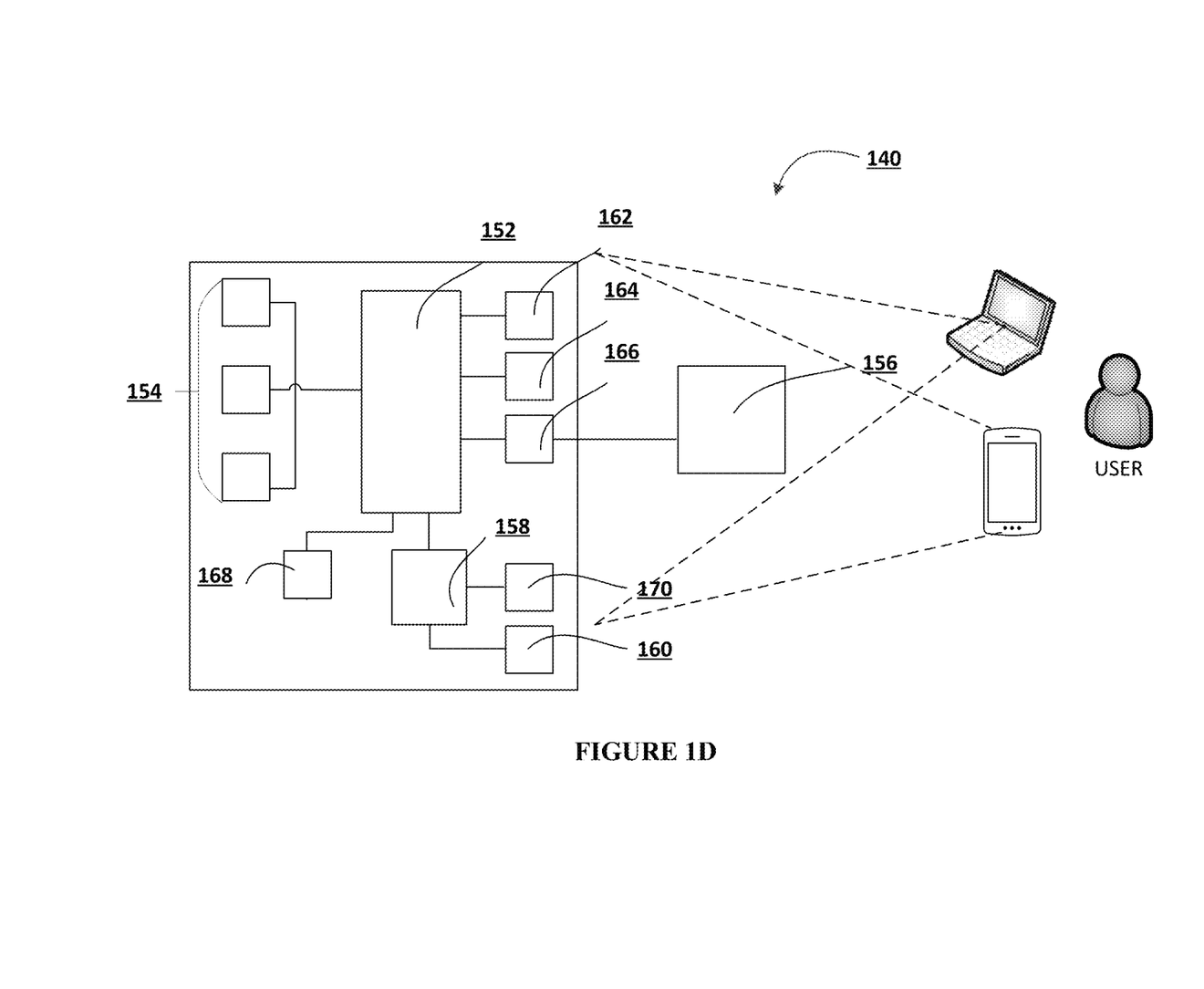

FIG. 1D illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140 or may also store applications or other information therein. In some embodiments, expansion memory may include instructions to carry out or supplement the processes described above and may include secure information also. For example, expansion memory may be provided as a security module for user input system 140 and may be programmed with instructions that permit secure use of user input system 140. In addition, secure applications may be provided via the SIMM cards, along with additional information, such as placing identifying information on the SIMM card in a non-hackable manner. In some embodiments, the user may use the applications, such as the P2P mobile application, to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the institution system 130 and/or the P2P system 150 via the network 110. Any communication between the institution system 130, the P2P system 150, and the user input system 140 (or any other computing devices) may be subject to an authentication protocol allowing the institution system 130 to maintain security by permitting only authenticated users (or processes from the P2P system 150) to access the protected resources of the institution system 130, which may include servers, databases, applications, and/or any of the components described herein. To this end, the institution system 130 may require the user (or process) to provide authentication credentials to determine whether the user (or process) is eligible to access the protected resources. Once the authentication credentials are validated and the user (or process) is authenticated, the institution system 130 may provide the user (or process) with permissioned access to the protected resources. Similarly, the user input system 140, the P2P system 150 (or any other computing devices) may provide the institution system 130 with permissioned to access the protected resources of the user input institution system 130 (or any other computing devices), which may include a GPS device, an image capturing component (e.g., camera), a microphone, a speaker, and/or any of the components described herein.

The user input system 140 may communicate with the institution system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input system 140, which may be used as appropriate by applications running thereon, and in some embodiments, one or more applications operating on the institution system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the institution system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1A, the components of the institution system 130, the P2P system 150, and the user input system 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the institution system 130, the P2P system 150, and the user input system 140 may have a client-server relationship, where the user input institution system 130 makes a service request to the institution system 130 and/or the P2P system 150, the institution system 130 and/or the P2P system 150 accepts the service request, processes the service request, and returns the requested information to the user input system 140, and vice versa. This relationship of client and server typically arises by virtue of computer programs running on the respective computers and having a client-server relationship to each other.

It will be understood that the embodiment of the system environment 100 illustrated in FIGS. 1A-1D are exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some, or all of the portions of the institution system 130 may be separated into two or more distinct portions.

Figure 2:
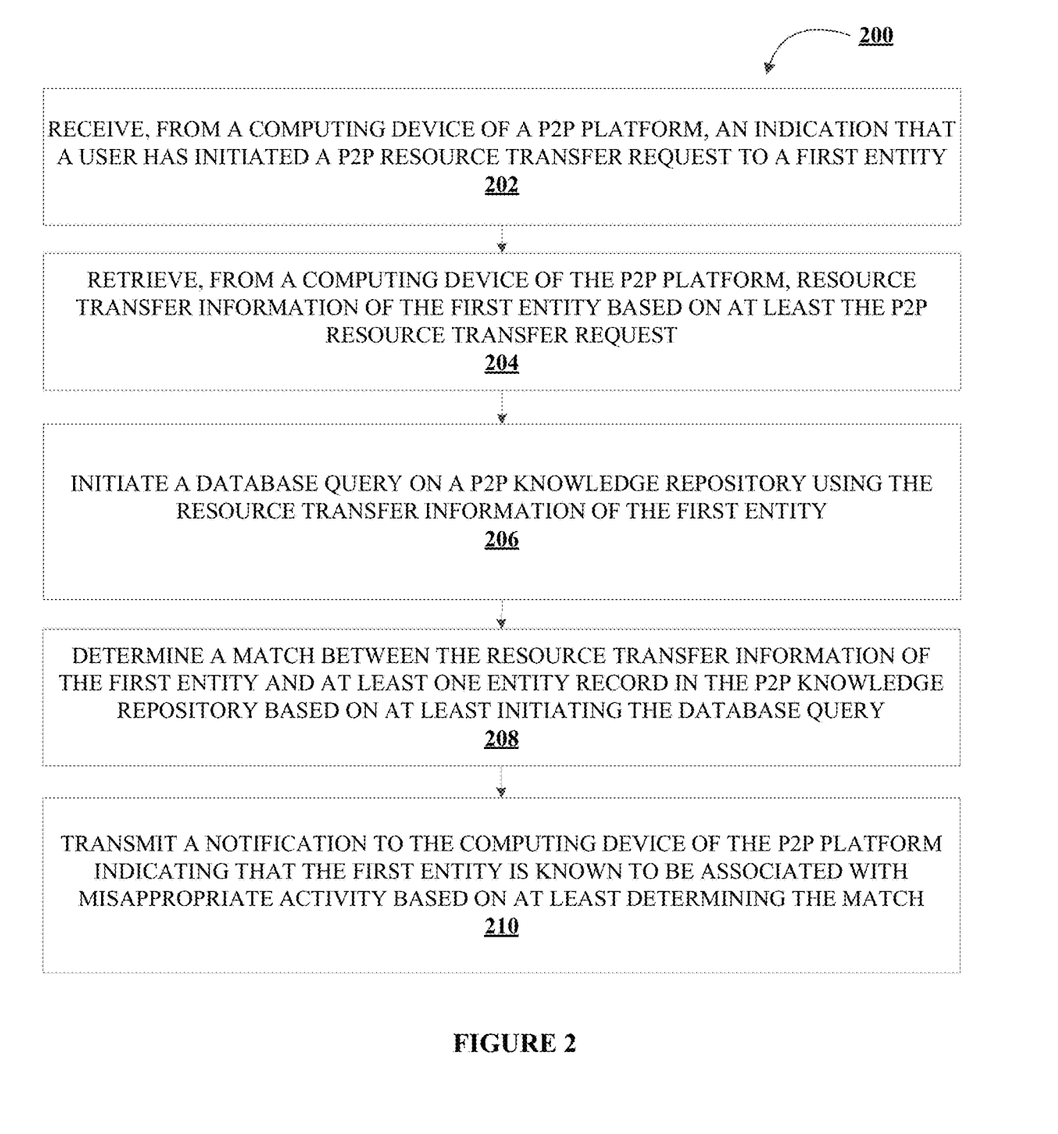
FIG. 2 illustrates a process flow for a collaborative exposure detection in P2P platforms, in accordance with an embodiment of the invention.

FIG. 2 illustrates a process flow for a collaborative exposure detection in P2P platforms 200, in accordance with an embodiment of the invention. As shown in block 202, the process flow includes receiving, from a computing device of a P2P platform, an indication that a user has initiated a P2P resource transfer request to a first entity. As described herein, the user may initiate the P2P resource transfer request using a P2P mobile application stored on the computing device of the user. When the user initiates the request via the P2P mobile application, the request is received by the P2P system 150, and more specifically, by a computing device of the P2P platform (P2P system 150). In response, the computing device of the P2P platform communicates with the institution system 130 indicating that the user has initiated the P2P resource transfer request.

As shown in block 204, the process flow includes retrieving, from a computing device of the P2P platform, resource transfer information of the first entity based on at least the P2P resource transfer request. In some embodiments, the resource transfer information may include information associated with the P2P resource distribution account (e.g., P2P account information) associated with the first entity. In one aspect, the resource transfer information may be publicly identifiable information that is used to identify the first entity to one or more users and/or one or more entities within the P2P network/platform. When the user wishes to transfer resources using the P2P network to the first entity, the user may identify the first entity using the resource transfer information provided by the first entity to the user. The user may use this information to initiate a P2P resource transfer request via the P2P mobile application stored on the computing device of the user. When the user initiates the P2P resource transfer request, the computing device of the P2P platform may receive the P2P resource transfer request and the resource transfer information of the first entity for identification.

As shown in block 206, the process flow includes initiating a database query on a P2P knowledge repository using the resource transfer information of the first entity. In some embodiments the P2P knowledge repository may include information (such as the resource transfer information) associated with one or more entities that have been previously known to be associated with misappropriate activity within the P2P network/platform. This may be identified based on information received from other users and/or entities that have interacted with the first entity previously and have had resources misappropriated during the P2P resource transfers.

As shown in block 208, the process flow includes determining a match between the resource transfer information of the first entity and at least one entity record in the P2P knowledge repository based on at least initiating the database query. If the resource transfer information of the first entity is listed in the P2P knowledge repository, it may be an indication that the first entity has previously been associated with misappropriate activity.

As shown in block 210, the process flow includes transmitting a notification to the computing device of the P2P platform indicating that the first entity is known to be associated with misappropriate activity based on at least determining the match. In some embodiments, in response to transmitting the notification to the computing device of the P2P platform, the institution system 130 may be configured to trigger a notification to be sent from the computing device of the P2P platform to the computing device of the user, via the P2P mobile application, indicating that the first entity has been associated with misappropriate activity. In one aspect, in response to triggering a notification, the institution system 130 may be configured to trigger control signals to be transmitted from the computing device of the P2P platform to the user computing device, via the P2P mobile application, denying the P2P resource transfer.

As described herein, the resource transfer information associated with the first entity may be public information available to the one or more users and/or one or more entities to initiate P2P resource transfers with the first entity. However, to acquire the resource transfer information from the P2P system 150 and participate in P2P resource transfers with one another, the one or more users and/or the one or more entities (including the first entity) are required to provide additional information to the P2P system 150 (that is accessible by the computing device of the P2P platform). This additional information may include device identification information, personal identification information, and resource distribution account information. In some embodiments, the device identification information may include a distinct string of alpha-numeric characters that identify the computing device of the user used by the user to initiate and/or receive P2P resource transfers. In some embodiments, the personal identification information may include information that directly identifies the one or more users and/or the one or more entities (e.g., name, address, social security number or other identifying number or code, phone number, email address, and/or the like). In some embodiments, the resource distribution account information may include identifiable information associated with one or more resource distribution accounts of the user (e.g., financial institution account information of the user). Once the information provided by the one or more users and/or the one or more entities is verified by the P2P system 150, the P2P system 150 may provide the each of the one or more users and/or the one or more entities with a distinct resource transfer information to initiate P2P resource transfers. In response, the P2P system 150 may link the device identification information, the personal identification information, the resource distribution account information, and the resource transfer information for each of the one or more users and/or the one or more entities. While the device identification information, the personal identification information, and the resource distribution account information may be protected information within the P2P system 150, the resource transfer information of may be publicly available information.

Similarly, to acquire the resource distribution account information from the institution system 150, the one or more users and/or the one or more entities are required to provide additional information that may include device identification information and personal identification information. Once the information provided by the one or more users and/or the one or more entities is verified by the institution system 130, the institution system 130 may provide the each of the one or more users and/or the one or more entities with a distinct resource distribution account information. In response, the institution system 130 may link the device identification information, the personal identification information, and the resource distribution account information for each of the one or more users and/or the one or more entities. Typically, the device identification information and/or the personal identification information provided by the one or more users and/or the one or more entities to the P2P system 150 and the institution system 130 to acquire a resource transfer information from the P2P system 150 and a resource distribution account information from the institution system 130 may be identical. This is an indication that the one or more users and/or the one or more entities are not misrepresenting themselves—an indication that the one or more users and/or the one or more entities are likely to not be associated with misappropriate activity.

Figure 3:
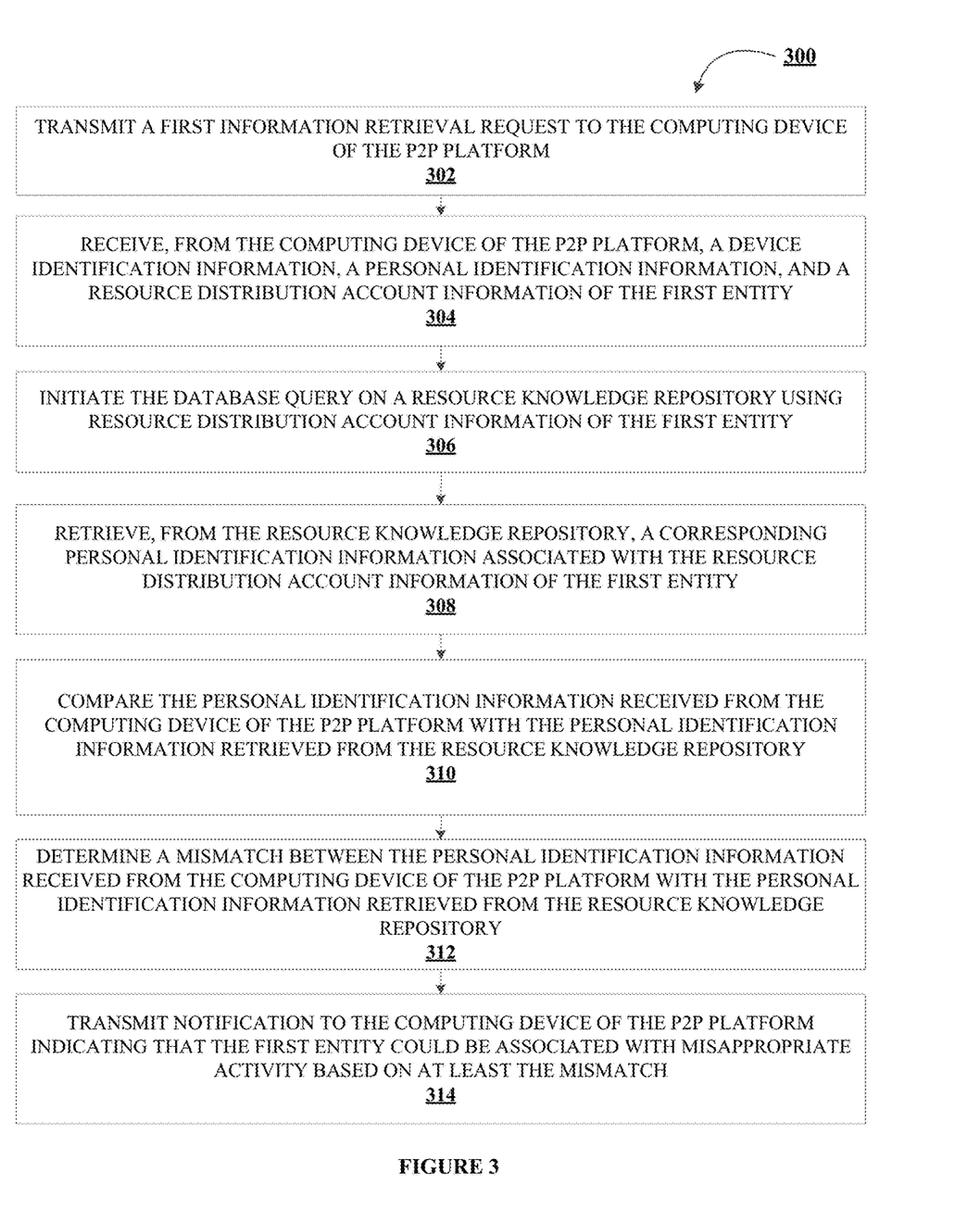
FIG. 3 illustrates a process flow for identity-based exposure detection in P2P platforms, in accordance with an embodiment of the invention.

FIG. 3 illustrates a process flow for identity-based exposure detection in P2P platforms 300, in accordance with an embodiment of the invention. In some embodiments, the institution system 130 may be configured to determine that the resource transfer information of the first entity does not match at least one entity record in the P2P knowledge repository. In such cases, as shown in block 302, the process flow includes transmitting a first information retrieval request to the computing device of the P2P platform, wherein the first information retrieval request comprises the resource transfer information of the first entity.

Next, as shown in block 304, the process flow includes receiving, from the computing device of the P2P platform, a device identification information, a personal identification information, and a resource distribution account information of the first entity in response to the first information retrieval request. By transmitting the first information retrieval request to the computing device of the P2P platform using the resource transfer information, the institution system 130 may be configured to retrieve any linked information (such as the personal identification information and/or the device identification information) associated with the first entity as registered with the P2P system 150.

Next, as shown in block 306, the process flow includes initiating the database query on a resource knowledge repository using resource distribution account information of the first entity. In some embodiments, the resource knowledge repository may include information associated with one or more users and/or the one or more entities that have registered with the institution system 130 previously and have acquired one or more resource distribution account information.

Next, as shown in block 308, the process flow includes retrieving, from the resource knowledge repository, a corresponding personal identification information associated with the resource distribution account information of the first entity. Similarly, by using the resource distribution account information of the first entity, the institution system 130 may be configured to retrieve any linked information (such as the personal identification information and/or the device identification information) associated with the first entity as registered with the institution system 130.

Next, as shown in block 310, the process flow includes comparing the personal identification information received from the computing device of the P2P platform with the personal identification information retrieved from the resource knowledge repository. As described herein, the personal identification information received from the computing device of the P2P platform and the personal identification information retrieved from the resource knowledge repository must typically be identical. Any mismatch in the information may be cause for concern regarding misappropriate activity.

Next, as shown in block 312, the process flow includes determining a mismatch between the personal identification information received from the computing device of the P2P platform with the personal identification information retrieved from the resource knowledge repository. Next, as shown in block 314, the process flow includes transmitting notification to the computing device of the P2P platform indicating that the first entity could be associated with misappropriate activity based on at least the mismatch.

In response, the institution system 130 may be configured to transmit a notification to the computing device of the P2P platform indicating that the first entity could be associated with misappropriate activity based on at least determining the mismatch. In some embodiments, in response to transmitting the notification to the computing device of the P2P platform, the institution system 130 may be configured to trigger a notification to be sent from the computing device of the P2P platform to the computing device of the user, via the P2P mobile application, indicating that the first entity could be associated with misappropriate activity. In one aspect, in response to triggering a notification, the institution system 130 may be configured to trigger control signals to be transmitted from the computing device of the P2P platform to the user computing device, via the P2P mobile application, temporarily halt the P2P resource transfer until additional authorization is received from the P2P system 150.

In some embodiments, the user may be required to provide a valid phone number to the P2P system 150 to successfully register with the P2P system 150. To acquire a valid phone number, the one or more users and/or the one or more entities may be required to provide additional information that may include personal identification information to a telecommunication carrier system (not shown). Once the information provided by the one or more users and/or the one or more entities is verified by the telecommunication carrier system, the telecommunication carrier system may provide the each of the one or more users and/or the one or more entities with a valid phone number. In response, the telecommunication carrier system may link the personal identification information with the phone number and/or a device identification information for each of the one or more users and/or the one or more entities. Typically, the personal identification information provided by the one or more users and/or the one or more entities to the telecommunication carrier system, the P2P system 150, and the institution system 130 may be identical. This is an indication that the one or more users and/or the one or more entities are not misrepresenting themselves—an indication that the one or more users and/or the one or more entities are likely to not be associated with misappropriate activity.

In some embodiments, the institution system 130 may be configured to retrieve, from the telecommunication carrier system, the personal identification information associated with the first entity based on at least the device identification information and/or the phone number associated with the first entity. In response, the institution system 130 may be configured to compare the personal identification information received from the telecommunication carrier system with the personal identification information received from the computing device of the P2P platform and the personal identification information retrieved from the resource knowledge repository to determine a match. If the personal identification information does not match, the institution system 130 may be configured to transmit a notification to the computing device of the P2P platform indicating that the first entity could be associated with misappropriate activity.

In some embodiments, the institution system 130 may be configured to receive, from a computing device of a user, an exposure notification associated with a second entity, wherein the exposure notification is associated with a second resource transfer. In response, the institution system 130 may be configured to retrieve, from the exposure notification, a second resource transfer information of the second entity. Next, the institution system 130 may be configured to transmit a second information retrieval request to the computing device of the P2P platform, wherein the second information retrieval request comprises the second resource transfer information of the second entity. In response, the institution system 130 may be configured to receive, from the computing device of the P2P platform, a device identification information, a personal identification information, and a resource distribution account information of the second entity in response to the second information retrieval request. In response, the institution system 130 may be configured to generate an entity record associated with the second entity, wherein the entity record comprises at least the second resource transfer information, the device identification information, the personal identification information, and the resource distribution account information of the second entity. In response to generating the entity record, the institution system 130 may be configured to store the entity record associated with the second entity in the P2P knowledge repository.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for identity-based exposure detection in peer-to-peer (P2P) platforms, the system comprising: at least one non-transitory storage device; and at least one processing device coupled to the at least one non-transitory storage device, wherein the at least one processing device is configured to: receive, from a computing device of a P2P platform, an indication that a user has initiated a P2P resource transfer request to a first entity; retrieve, from a computing device of the P2P platform, resource transfer information of the first entity based on at least the P2P resource transfer request; initiate a database query on a P2P knowledge repository using the resource transfer information of the first entity; determine that the resource transfer information of the first entity does not match at least one entity record in the P2P knowledge repository; receive, from the computing device of the P2P platform, a device identification information, a personal identification information, and a resource distribution account information of the first entity; initiate the database query on a resource knowledge repository using resource distribution account information of the first entity; retrieve, from the resource knowledge repository, a corresponding personal identification information associated with the resource distribution account information of the first entity; compare the personal identification information received from the computing device of the P2P platform with the personal identification information retrieved from the resource knowledge repository; determine a mismatch between the personal identification information received from the computing device of the P2P platform with the personal identification information retrieved from the resource knowledge repository; and transmit notification to the computing device of the P2P platform indicating that the first entity could be associated with misappropriate activity based on at least the mismatch.

2. The system of claim 1, wherein the at least one processing device is further configured to: determine that the resource transfer information of the first entity does not match at least one entity record in the P2P knowledge repository; and transmit a first information retrieval request to the computing device of the P2P platform, wherein the first information retrieval request comprises the resource transfer information of the first entity.

3. The system of claim 1, wherein the at least one processing device is further configured to: receive, from a computing device of a user, an exposure notification associated with a second entity, wherein the exposure notification is associated with a second resource transfer; and retrieve, from the exposure notification, a second resource transfer information of the second entity.

4. The system of claim 3, wherein the at least one processing device is further configured to: transmit a second information retrieval request to the computing device of the P2P platform, wherein the second information retrieval request comprises the second resource transfer information of the second entity; and receive, from the computing device of the P2P platform, a device identification information, a personal identification information, and a resource distribution account information of the second entity in response to the second information retrieval request.

5. The system of claim 4, wherein the at least one processing device is further configured to: generate an entity record associated with the second entity, wherein the entity record comprises at least the second resource transfer information, the device identification information, the personal identification information, and the resource distribution account information of the second entity; and store the entity record associated with the second entity in the P2P knowledge repository.

6. The system of claim 1, wherein the resource transfer information of the first entity comprises at least a P2P account information.

7. A computer program product for identity-based exposure detection in peer-to-peer (P2P) platforms, the computer program product comprising a non-transitory computer-readable medium comprising code causing a first apparatus to: receive, from a computing device of a P2P platform, an indication that a user has initiated a P2P resource transfer request to a first entity; retrieve, from a computing device of the P2P platform, resource transfer information of the first entity based on at least the P2P resource transfer request; initiate a database query on a P2P knowledge repository using the resource transfer information of the first entity; determine that the resource transfer information of the first entity does not match at least one entity record in the P2P knowledge repository; receive, from the computing device of the P2P platform, a device identification information, a personal identification information, and a resource distribution account information of the first entity; initiate the database query on a resource knowledge repository using resource distribution account information of the first entity; retrieve, from the resource knowledge repository, a corresponding personal identification information associated with the resource distribution account information of the first entity; compare the personal identification information received from the computing device of the P2P platform with the personal identification information retrieved from the resource knowledge repository; determine a mismatch between the personal identification information received from the computing device of the P2P platform with the personal identification information retrieved from the resource knowledge repository; and transmit notification to the computing device of the P2P platform indicating that the first entity could be associated with misappropriate activity based on at least the mismatch.

8. The computer program product of claim 7, wherein the first apparatus is further configured to: determine that the resource transfer information of the first entity does not match at least one entity record in the P2P knowledge repository; and transmit a first information retrieval request to the computing device of the P2P platform, wherein the first information retrieval request comprises the resource transfer information of the first entity.

9. The computer program product of claim 7, wherein the first apparatus is further configured to: receive, from a computing device of a user, an exposure notification associated with a second entity, wherein the exposure notification is associated with a second resource transfer; and retrieve, from the exposure notification, a second resource transfer information of the second entity.

10. The computer program product of claim 9, wherein the first apparatus is further configured to: transmit a second information retrieval request to the computing device of the P2P platform, wherein the second information retrieval request comprises the second resource transfer information of the second entity; and receive, from the computing device of the P2P platform, a device identification information, a personal identification information, and a resource distribution account information of the second entity in response to the second information retrieval request.

11. The computer program product of claim 10, wherein the first apparatus is further configured to: generate an entity record associated with the second entity, wherein the entity record comprises at least the second resource transfer information, the device identification information, the personal identification information, and the resource distribution account information of the second entity; and store the entity record associated with the second entity in the P2P knowledge repository.

12. The computer program product of claim 7, wherein the resource transfer information of the first entity comprises at least a P2P account information.

13. A method for identity-based exposure detection in peer-to-peer (P2P) platforms, the method comprising: receiving, from a computing device of a P2P platform, an indication that a user has initiated a P2P resource transfer request to a first entity; retrieving, from a computing device of the P2P platform, resource transfer information of the first entity based on at least the P2P resource transfer request; initiating a database query on a P2P knowledge repository using the resource transfer information of the first entity; determining that the resource transfer information of the first entity does not match at least one entity record in the P2P knowledge repository; receiving, from the computing device of the P2P platform, a device identification information, a personal identification information, and a resource distribution account information of the first entity; initiating the database query on a resource knowledge repository using resource distribution account information of the first entity; retrieving, from the resource knowledge repository, a corresponding personal identification information associated with the resource distribution account information of the first entity; comparing the personal identification information received from the computing device of the P2P platform with the personal identification information retrieved from the resource knowledge repository; determining a mismatch between the personal identification information received from the computing device of the P2P platform with the personal identification information retrieved from the resource knowledge repository; and transmitting notification to the computing device of the P2P platform indicating that the first entity could be associated with misappropriate activity based on at least the mismatch.

14. The method of claim 13, wherein the method further comprises: determining that the resource transfer information of the first entity does not match at least one entity record in the P2P knowledge repository; and transmitting a first information retrieval request to the computing device of the P2P platform, wherein the first information retrieval request comprises the resource transfer information of the first entity.

15. The method of claim 13, wherein the method further comprises: receiving, from a computing device of a user, an exposure notification associated with a second entity, wherein the exposure notification is associated with a second resource transfer; and retrieving, from the exposure notification, a second resource transfer information of the second entity.

16. The method of claim 15, wherein the method further comprises: transmitting a second information retrieval request to the computing device of the P2P platform, wherein the second information retrieval request comprises the second resource transfer information of the second entity; and receiving, from the computing device of the P2P platform, a device identification information, a personal identification information, and a resource distribution account information of the second entity in response to the second information retrieval request.

17. The method of claim 16, wherein the method further comprises: generating an entity record associated with the second entity, wherein the entity record comprises at least the second resource transfer information, the device identification information, the personal identification information, and the resource distribution account information of the second entity; and storing the entity record associated with the second entity in the P2P knowledge repository.

* * * * *